(12) United States Patent
Heinla et al.

(10) Patent No.: US 11,227,497 B2
(45) Date of Patent: *Jan. 18, 2022

(54) MOBILE ROBOT HAVING COLLISION AVOIDANCE SYSTEM FOR CROSSING A ROAD FROM A PEDESTRIAN PATHWAY

(71) Applicant: Starship Technologies OÜ, Tallinn (EE)

(72) Inventors: Ahti Heinla, Tallinn (EE); Risto Reinpõld, Harjumaa (EE); Kristjan Korjus, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 180 days.

This patent is subject to a terminal disclaimer.

(21) Appl. No.: 16/387,978

(22) Filed: Apr. 18, 2019

(65) Prior Publication Data

US 2019/0244525 A1 Aug. 8, 2019

Related U.S. Application Data

(63) Continuation of application No. 15/695,157, filed on Sep. 5, 2017, now Pat. No. 10,282,995.

(51) Int. Cl.
*G05D 1/02* (2020.01)
*G08G 1/16* (2006.01)
(Continued)

(52) U.S. Cl.
CPC ........... *G08G 1/166* (2013.01); *G05D 1/0088* (2013.01); *G05D 1/0214* (2013.01);
(Continued)

(58) Field of Classification Search
None
See application file for complete search history.

(56) References Cited

U.S. PATENT DOCUMENTS 4,549,841 A 10/1985 Ishige
4,666,042 A 5/1987 Dlott et al.
(Continued)

FOREIGN PATENT DOCUMENTS

JP 2009-294897 A 12/2009
WO WO 2011/035839 A2 3/2011
(Continued)

OTHER PUBLICATIONS

Ackerman, "Startup Developing Autonomous Delivery Roberts That Travel on Sidewalks," *IEEE Spectrum*, Nov. 2, 2015.
(Continued)

*Primary Examiner* — Genna M Mott
(74) *Attorney, Agent, or Firm* — Womble Bond Dickinson (US) LLP

(57) ABSTRACT

A collision avoidance method and system for a mobile robot crossing a road. When a mobile robot approaches a road, it senses road conditions via at least one first sensor, and initiates road crossing if the road conditions are deemed suitable for crossing. As it crosses the road, the mobile robot senses, via at least one second sensor, a change in the road conditions indicating the presence of at least one hazardous moving object. In response to determining that at least one hazardous object in present, the mobile robot initiates a collision avoidance maneuver. A mobile robot configured to avoid collisions while crossing a road includes: at least one first sensor configured to sense road conditions, at least one second sensor configured to sense road conditions, and a processing component configured to carry out one or more collision avoidance maneuvers.

10 Claims, 6 Drawing Sheets

(51) Int. Cl.
*G05D 1/00* (2006.01)
*G08G 1/01* (2006.01)

(52) U.S. Cl.
CPC ......... *G05D 1/0223* (2013.01); *G08G 1/0104* (2013.01); *G08G 1/161* (2013.01); *G05D 1/0246* (2013.01); *G05D 1/0255* (2013.01); *G05D 1/0257* (2013.01); *G05D 2201/0213* (2013.01)

(56) References Cited

U.S. PATENT DOCUMENTS

| | | |
|---|---|---|
| 4,871,597 A | 10/1989 | Hobson |
| 5,190,376 A | 3/1993 | Book |
| 5,652,489 A * | 7/1997 | Kawakami ........... G05D 1/0242 318/568.12 |
| 5,664,928 A | 9/1997 | Stauber |
| 5,857,778 A | 1/1999 | Ells |
| 5,942,869 A | 8/1999 | Katou et al. |
| 6,048,099 A | 4/2000 | Muffett et al. |
| 6,281,477 B1 | 8/2001 | Forrester et al. |
| 6,467,293 B1 | 10/2002 | Goosman |
| 6,602,037 B2 | 8/2003 | Winkler |
| 7,040,115 B1 | 5/2006 | Lopez et al. |
| 7,073,634 B2 | 7/2006 | Mitchell et al. |
| 7,894,939 B2 | 2/2011 | Zini et al. |
| 7,931,431 B2 | 4/2011 | Benedict et al. |
| 8,332,991 B2 | 12/2012 | Blaak et al. |
| 8,485,285 B2 | 7/2013 | Ferrigni |
| 8,948,914 B2 | 2/2015 | Zini et al. |
| 9,020,632 B2 | 4/2015 | Naylor |
| 9,031,692 B2 | 5/2015 | Zhu |
| 9,120,622 B1 | 9/2015 | Elazary et al. |
| 9,244,147 B1 | 1/2016 | Soundararajan et al. |
| 9,256,852 B1 | 2/2016 | Myllymaki |
| 9,266,675 B2 | 2/2016 | Yamashita |
| 9,373,149 B2 | 6/2016 | Abhyanker |
| 9,428,163 B2 | 8/2016 | Breuer et al. |
| 9,535,421 B1 | 1/2017 | Canoso et al. |
| 9,557,740 B2 | 1/2017 | Crawley |
| 9,561,941 B1 | 2/2017 | Watts |
| 9,630,619 B1 | 4/2017 | Kentley et al. |
| 9,682,481 B2 | 6/2017 | Lutz et al. |
| 9,694,976 B1 | 7/2017 | Wurman et al. |
| 9,791,557 B1 | 10/2017 | Wyrwas et al. |
| 9,844,879 B1 | 12/2017 | Cousins et al. |
| 10,282,995 B2 * | 5/2019 | Heinla ................... G08G 1/166 |
| 2003/0165373 A1 | 9/2003 | Felder et al. |
| 2005/0165550 A1 | 7/2005 | Okada |
| 2006/0237239 A1 | 10/2006 | Bruner et al. |
| 2008/0039974 A1* | 2/2008 | Sandin ................... B60L 50/52 700/258 |
| 2011/0071761 A1 | 3/2011 | Cummings |
| 2012/0090110 A1 | 4/2012 | Van Den Berg et al. |
| 2012/0101632 A1 | 4/2012 | Ha et al. |
| 2013/0110281 A1 | 5/2013 | Jones et al. |
| 2013/0116880 A1 | 5/2013 | Shitamoto et al. |
| 2013/0332021 A1 | 12/2013 | Goren |
| 2014/0032049 A1 | 1/2014 | Moshchuk et al. |
| 2014/0081445 A1 | 3/2014 | Villamar |
| 2014/0136414 A1 | 5/2014 | Abhyanker |
| 2014/0254896 A1 | 9/2014 | Zhou et al. |
| 2014/0365258 A1 | 12/2014 | Vestal et al. |
| 2015/0006005 A1 | 1/2015 | Yu et al. |
| 2015/0045945 A1 | 2/2015 | Zini et al. |
| 2015/0100152 A1 | 4/2015 | Barragán Treviño et al. |
| 2015/0183581 A1 | 7/2015 | Worsley |
| 2015/0227882 A1 | 8/2015 | Bhatt |
| 2015/0251319 A1 | 9/2015 | Ishikawa et al. |
| 2015/0379468 A1 | 12/2015 | Harvey |
| 2016/0033966 A1 | 2/2016 | Farris et al. |
| 2016/0068264 A1 | 3/2016 | Ganesh et al. |
| 2016/0104099 A1 | 4/2016 | Villamar |
| 2016/0148440 A1 | 5/2016 | Kwak |
| 2016/0185466 A1 | 6/2016 | Dreano, Jr. |
| 2016/0193733 A1* | 7/2016 | Abdullah ........... A61B 5/14532 700/240 |
| 2016/0207710 A1 | 7/2016 | Conrad et al. |
| 2016/0239798 A1 | 8/2016 | Borley et al. |
| 2016/0325928 A1 | 11/2016 | Lepek |
| 2016/0355337 A1 | 12/2016 | Lert et al. |
| 2016/0368464 A1 | 12/2016 | Hassounah |
| 2017/0017237 A1 | 1/2017 | Tokuyama et al. |
| 2017/0032315 A1 | 2/2017 | Gupta et al. |
| 2017/0043768 A1 | 2/2017 | Prokhorov |
| 2017/0100837 A1 | 4/2017 | Zevenbergen et al. |
| 2017/0185853 A1 | 6/2017 | Yokota et al. |
| 2017/0220981 A1 | 8/2017 | Shucker et al. |
| 2017/0248966 A1 | 8/2017 | Lutz et al. |
| 2017/0267452 A1 | 9/2017 | Goren et al. |
| 2017/0273161 A1* | 9/2017 | Nakamura ........... H05B 47/105 |
| 2017/0364074 A1 | 12/2017 | Lau et al. |
| 2017/0368684 A1 | 12/2017 | Zevenbergen et al. |
| 2018/0005169 A1 | 1/2018 | High et al. |
| 2018/0020896 A1 | 1/2018 | High et al. |
| 2018/0024554 A1 | 1/2018 | Brady et al. |
| 2018/0079626 A1 | 3/2018 | Brady et al. |
| 2018/0260635 A1 | 9/2018 | Al-Dahle et al. |
| 2018/0329418 A1 | 11/2018 | Baalke et al. |

FOREIGN PATENT DOCUMENTS

| | | |
|---|---|---|
| WO | WO 2017/100170 | 6/2017 |
| WO | WO 2017/156586 | 9/2017 |
| WO | WO 2017/196759 | 11/2017 |
| WO | WO-2018098161 A1 * | 5/2018 ............ G05D 1/024 |

OTHER PUBLICATIONS

Anonymous, "Lieferroboter Starship: Klauen würde ich ihn nicht'—Auto—Tagesspiegel," Nov. 29, 2015, retrieved from the Internet, URL: http://www.tagesspiegel.de/mobil/lieferroboter-starship-klauen-wuerde-ich-ihn-nicht/12647114.html.

Anonymous, "Radio-frequency identification," https://en.wikipedia.org/w/index.php?title+Radio-frequency_identification&oldid=752391280, retrieved Dec. 1, 2016.

Baker et al., "Automated Street Crossing for Assistive Robots," Rehabilitation Robotics, 2005, ICORR 2005, 9$^{th}$ International Conference on. IEEE, 2005.

HowStuffWorks: "How UPS Works," https://www.youtube.com/watch?v=pcsk9nEKPGM, retrieved Mar. 9, 2007.

Pettitt, "Forget delivery Silvery drones, meet your new delivery robot," Nov. 2, 2015, retrieved from the Internet, URL: https://www.cnbc.com/2015/11/02/forget-delivery-drones-meet-your-new-delivery-robot.html.

Ichinose et al., "Development of Single-passenger Mobility-Support Robot "ROPITS"—Verification of Autonomous Run Function to Sidewalk Arbitrary Point Specified with Map of Portable Informational Terminal," No. 13-2 Proceedings of the 2013 JSME Conference on Robotics and Mechatronics, Tsukuba, Japan, May 22-25, 2013 (includes English abstract).

Iimura et al., "Development of Single-passenger Mobility-Support Robot "ROPITS"—Veritifcation of Self-Localization Function with Camera Images," No. 14-2 Proceedings of the 2014 JSME Conference on Robotics and Mechatronics, Toyama, Japan, May 25-29, 2014 (includes English abstract).

Iimura et al., "Development of Single-passenger Mobility-Support Robot "ROPITS"—Recovery from Position Lost Using Similar Images," No. 15-2 Proceedings of the 2015 JSME Conference on Robotics and Mechatronics, Kyoto, Japan, May 17-19, 2015 (includes English abstract).

Chand et al., "Navigation strategy and path planning for autonomous road crossing by outdoor mobile robots," Advanced Robotics (ICAR), 2011 IEEE 15$^{th}$ Int'l Conf, Jun. 20, 2011, pp. 161-167.

Chand et al., "Vision and Laser Sensor Data Fusion Technique for Target Approaching by Outdoor Mobile Robot," Robotics and Biomimetics (RoBio), 2010 IEEE Int'l Conf, Dec. 14, 2010, pp. 1624-1629.

(56) References Cited

OTHER PUBLICATIONS

European Office Action dated Aug. 12, 2021, issued in EP counterpart application (No. 18758896.7).

* cited by examiner

MOBILE ROBOT HAVING COLLISION AVOIDANCE SYSTEM FOR CROSSING A ROAD FROM A PEDESTRIAN PATHWAY

RELATED APPLICATIONS

This is a Continuation of U.S. patent application Ser. No. 15/695,157 filed Sep. 5, 2017, now U.S. Pat. No. 10,282,995. The contents of the aforementioned application are incorporated by reference in their entirety.

FIELD OF THE INVENTION

The invention relates to package delivery by robots operating on pedestrian walkways. More specifically, the invention relates to collision avoidance measures of such robots when crossing vehicle roads.

BACKGROUND

Due to the rise of online shopping, meal or groceries delivery and similar ventures, item delivery is a growing industry worldwide. Traditionally, packages have been transported by land, water or air to a depot before being loaded onto trucks to be delivered to a final destination by the driver. Meals, groceries or similar items with a shorter shelf life have typically been transported from a restaurant or supermarket by a courier driving a van, smaller motor vehicle, or a bike. Various items can also be delivered on foot by couriers.

While ensuring efficient delivery direct to the customer, these methods have some drawbacks. Drivers or couriers may prefer to take evenings, nights, weekends or public holidays off. Therefore, the times when customers can receive their deliveries usually correspond to typical working hours. Furthermore, the usage of vans or other motor vehicles for package or food delivery contributes to traffic, air pollution and energy expenditure in the cities. Even further, many houses or other residences may be inaccessible for larger motor vehicles such as vans or smaller cars, as they may be only accessible for pedestrian-type traffic.

Recently, developments in computer vision and autonomous driving have led to the development of delivery robots. The robots can comprise a plurality of sensors for observing the environment around them and making decisions regarding navigation, obstacle avoidance and so on. Such robots can drive autonomously or semi-autonomously and can transport packages on the last stretch of the delivery process (the "last mile"), or transport food and other consumables directly from the seller to the customer. Such robots can also be used in other applications relating to item purchases.

It can be particularly beneficial for delivery robots to operate on sidewalks and other pedestrian walkways. In this way, the robots can be smaller, drive slower and be safer to operate autonomously. Furthermore, the robots can be more energy efficient and less polluting. However, during operation or during the delivery process, such robots may need to cross a vehicle road. This should be done in a safe manner for all traffic participants. Since the robots may be shorter than an average human, drivers may oversee the robot while it is crossing the road. Furthermore, cars can sometimes appear suddenly from behind a corner, or after turning from another street in an intersection. In such situations, it can be beneficial for the delivery robots to have an additional obstacle avoidance protocol designed to optimize safety.

Some protocols or algorithms for avoiding collisions have been developed for driver-assistant systems in cars or as part of self-driving cars software.

For example, U.S. Pat. No. 9,428,163 B2 discloses a method for autonomous emergency braking in a road vehicle to avoid or reduce the severity of an accident. The method includes measuring the speed of the vehicle during autonomous emergency braking and additionally determining vehicle speed independent of the wheel rotational speeds of the vehicle. In this way, the vehicle speed can be determined sufficiently accurately even in the cases in which, as a result of sharp autonomous braking, the vehicle speed is higher than the wheel rotational speeds.

In another example, US patent application 2014/0032049 A1 discloses a collision avoidance system for assisting a driver in avoiding a collision between a host vehicle and obstacle. A processor recursively calculates a time-to-collision with the obstacle and an optimal collision avoidance path for avoiding the collision. The optimum collision avoidance path is recursively generated based on a position and speed of the host vehicle relative to the obstacle and an updated calculated time-to-collision. A sensing device determines whether the driver of the vehicle has initiated a steering maneuver to avoid the obstacle. A steering assist mechanism maintains the host vehicle along the optimum collision avoidance path.

Also, US patent application 2017/0043768 A1 discloses an autonomous vehicle that may operate in an environment in which there is an unexpected dynamic object. The autonomous vehicle can detect the dynamic object. It can be determined whether the dynamic object is on a collision course with the autonomous vehicle. Responsive to determining that the dynamic object is on a collision course with the autonomous vehicle, a driving maneuver for the autonomous vehicle can be determined. The driving maneuver can be based at least in part on the movement of the dynamic object. The autonomous vehicle can be caused to implement the determined driving maneuver.

More specific algorithms for avoiding collisions at intersections or crossings have also been disclosed for driver assistant systems or self-driving vehicles.

For example, Japanese patent application 2009-294897A considers the problem of avoiding own vehicle from colliding with a second obstacle which exists in the going back direction when own vehicle is made to go back in order to avoid collision with a first obstacle which is approaching from a right and left direction at an intersection, etc. with poor visibility. The document proposes to solve the problem by avoiding the collision of the first obstacle with the own vehicle by: extracting another vehicle which is approaching the own vehicle as the first obstacle by an obstacle extraction means M3 based on a detected result by an object detection means M2; determining the degree of risk of the first obstacle colliding with own vehicle by a degree of risk determining means M5; and varying the proceeding direction in which the own vehicle is to go back by a proceeding direction varying means M10 when the degree of a first risk is a prescribed value or more. In this case, collision with a second obstacle due to avoiding the collision with the first obstacle is prevented by determining the degree of a second risk for the own vehicle colliding with the second obstacle which exists in the going back direction by the degree of risk determining means M5 and varying the proceeding direction of the own vehicle by the proceeding direction varying means M10 according to the degree of the second risk.

In another example, US patent application 2011/0071761 A1 discloses a holistic cybernetic vehicle control that enables the results of machine sensing and decision making to be communicated to a vehicle operator through the various senses of the operator. By providing machine advice to the operator through various vehicle functions and by integrating the machine advice with what the operator senses and perceives, holistic cybernetic control can result in much better and safer vehicle operation. The invention integrates human and machine vehicle control action to improve vehicle operation and, particularly, to avoid collision events.

The prior art discussed above deals with collision avoidance measures for vehicles such as cars driving on public roads.

SUMMARY

It is the object of the present invention to disclose ways for mobile robots operating on pedestrian pathways, e.g., a sidewalk, pedestrian walkway, a pedestrian trail, a bike lane, or other "way" on which individuals walk run, hike, bike, etc., to increase safety during crossing of roads. It is also the object of the present invention to disclose mobile robots configured to safely cross car roads. It is also the object of the present invention to disclose a method for collision avoidance for autonomous or semi-autonomous delivery robots.

In a first embodiment, the invention discloses a method for collision avoidance for a mobile robot located on a pedestrian pathway to avoid collisions when crossing a road adjacent to the pedestrian pathway. The method comprises the mobile robot approaching a road. The method further comprises the mobile robot sensing road conditions via at least one first sensor. The method also comprises the mobile robot initiating road crossing if the road conditions are deemed suitable for crossing. The method further comprises, while crossing the road, the mobile robot sensing via at least one second sensor a change in the road conditions indicating at least one hazardous moving object. The method also comprises the mobile robot initiating a collision avoidance maneuver in response to determining that at least one hazardous moving object is present.

A road can refer herein to car roads, traffic roads, public roads, but also driveways, unpaved vehicle roads or gravel roads. In other words, "road" is used herein for any path that a passenger vehicle generally travels on (as opposed to a "pedestrian pathway", e.g., a "sidewalk" or "pedestrian walkway", or "bike lane", which represents paths generally taken by pedestrians, bikes, or sidewalk-travelling robots). Put differently, the mobile robots described herein primarily travel on pedestrian walkways or sidewalks, but have to occasionally cross roads (that is, vehicle roads) just as pedestrians do.

Road conditions are used in the present document to refer to a plurality of parameters that can be associated with a road. These parameters can comprise the status of traffic indicators such as traffic lights, the type of a road (the number of lanes, the busyness of traffic etc.), the weather conditions including visibility, sun glare, precipitation and other parameters and the presence of moving objects such as vehicles on the roads.

Road conditions suitable for crossing can comprise, for example, no moving objects detected, the traffic indicators showing "green" to the robot, a reasonable certainty that no cars have been missed due to weather conditions (such as a certainty of at least 80 or preferably at least 90%) and other similar conditions.

A change in the road conditions indicating a hazardous moving object generally refers to detecting such a hazardous moving object. However, it can also refer to traffic lights changing so that the robot no longer has right of way and would be prudent to retreat towards the side of the road or the sidewalk.

The present method is particularly advantageous for mobile robots that navigate outdoors environments at least partially autonomously or fully autonomously. As mentioned above, such robots can preferably travel on the sidewalks, but may be required to traverse traffic roads (i.e., "cross" traffic roads) in the course of their travel. It is important to maximize safety during such road crossings, and therefore implementing a maneuver specifically geared towards avoiding collisions can be very useful. The procedure for the collision avoidance maneuver that the robots use can be distinct from the normal object detection procedure. That is, those two subroutines can use different algorithms, as well as even different sensors. The two can be complementary in a sense, since the object avoidance procedure can use sensors that are more accurate over shorter ranges (so that when hazardous moving objects are closer to the robot). On the other hand, the object detection routine can use sensors that have a longer range in order to get a better general overview of moving objects around the robot. The first sensor (or a plurality of first sensors) can therefore provide data to the object detection routine that can then output that a road crossing can be initiated based on this data. The second sensor (or a plurality of second sensors) can provide data to the object avoidance maneuver routine, that can then initiate an object avoidance maneuver based on this data.

As mentioned above, the robots can be configured to navigate outdoors surroundings at least partially autonomously. To do this, the robots can be equipped with a computer vision routine that allows then to localize themselves in their surroundings and navigate accurately. The localization routine can be for example based on lines extracted from visual camera images. This is discussed at length in another document of the present applicant published as WO/2017/076929. Another advantage of the present object avoidance routine (that can also be referred to as an algorithm, subroutine, module and/or procedure) is that it can be independent of the localization routine. That is, even if the localization module indicates that no hazardous moving objects can be expected from a certain direction on a certain road crossing, the robot can still use the object avoidance maneuver if an object is detected from such a direction. The specific advantage is that a high incidence of "false alarm" avoidance maneuvers is by far preferable than even a small amount of accidental collisions. In this way, the object avoidance routine can add another level of redundancy to the robot's overall operation and make it overall safer.

In some preferred embodiments, the collision avoidance maneuver comprises at least one or a combination of applying a braking force and applying a reverse acceleration. That is, a maximum (or large) breaking power can be applied on the robot once the collision avoidance maneuver is initiated. Additionally or alternatively, a reverse acceleration (that is, acceleration in the direction opposite to the direction of travel of the robot across the road) can be applied on the robot. This can be done to get the robot out of the way of the hazardous moving object as soon as possible and increase the safety of the road crossing for the robot and for all other traffic participants. The reverse acceleration can be applied in such a way that the robot's forward speed decreases, passes zero and becomes negative (that is, reverse).

In some preferred embodiments, the collisions avoidance maneuver can comprise determining whether or not an object is directly behind the mobile robot and applying the reverse acceleration only if no object is sensed directly behind the mobile robot. That is, before executing an object avoidance maneuver comprising a reverse acceleration, the robot can verify that no pedestrians, cyclists or other traffic participants are located behind it, in order to avoid colliding with them during the object avoidance maneuver. The robot can also verify whether the object behind it is moving towards the robot or not (for example, a bike passing behind the robot on a perpendicular trajectory to its own would not prevent the robot from executing the object avoidance maneuver, since it would be gone by the time the robot returns to the sidewalk and/or bike lane). The robot can check whether the road behind it is clear up to a point where it would return to the sidewalk and/or be out of the way of the hazardous moving object.

In some such embodiments, the method can further comprise the step of the mobile robot sensing for objects directly behind it by sensing via at least one third sensor. The third sensor can comprise at least one of at least one radar, at least one visual camera, at least one stereo camera, at least one time of flight camera, at least one ultrasonic sensor and/or at least one Lidar sensor. The data sensed by the sensor can be processed to determine whether any pedestrians or other traffic participants are present behind the robot close enough to be affected by the object avoidance maneuver (that is, between the robot and the sidewalk and/or the side of the road, and/or just within the distance that the robot would need to retreat to avoid a collision). The third sensor can also be one or more of the same of different sensors as those comprising the first and the second sensors. For example, the third sensor can comprise a visual camera or an ultrasonic sensor placed on the rear of the robot. The third sensor's data can then be used as part of the object avoidance subroutine.

In some embodiments, the collision avoidance maneuver can comprise applying a forward acceleration. That is, instead of braking and reversing, the robot can also quickly move forward along its established direction of motion in order to avoid the collision. This can be particularly advantageous if the robot is already more than halfway across the road and/or if the robot detects a pedestrian or another traffic participant behind it.

In some embodiments, the collision avoidance maneuver can further comprise at least one of generating at least one audio signal and generating at least one visual signal. That is, the robot can attempt to get the attention of the driver of the approaching moving object by playing a loud sound and/or flashing lights. This can be done simultaneously with an abrupt forward or backward movement or instead of either in case objects are detected both behind and ahead of the robot. As the robot may be mostly below the typical height of traffic participants, it could happen that a driver overlooks it, and therefore getting their attention with a noise and/or a visual signal can alert the driver to the robot's presence and help prevent a collision.

In some embodiments, the sensing by at least one of the at least one first sensor and the at least one second sensor can comprise at least one or a combination of sensing by at least one radar, at least one visual camera, at least one stereo camera, at least one time of flight camera, at least one ultrasonic sensor and at least one Lidar sensor. For example, the first sensor can comprise a combination of visual camera(s) and Lidar, and the second sensor can comprise a combination of radar and ultrasonic sensors. Other combinations can also be possible, and the sensors need not be a combination of two or more sensors.

In some embodiments, the road conditions sensed by at least one of the first sensor and the second sensor can comprise at least one or a combination of sensing status of traffic indicators and presence of moving objects. In one example, the first sensor can comprise a camera that determines that the robot has right of way based on the traffic light. The robot can also determine that no cars are detected based on the camera input. The robot can then initiate a road crossing. During crossing, the robot's radar sensor (second sensor in this example) can indicate a presence of a moving object on a collision path with the robot and trigger the collision avoidance maneuver. However, the first and second sensor can also both comprise cameras, radar and other sensors and just input their data in two different routines (the general situational awareness routine including object detection vs the specific object avoidance routine). The object avoidance routine could then be more geared towards sensing objects located closer to the robot (and/or fast moving objects of a certain size) than the general situational awareness routine.

In some embodiments, the sensing of the status of traffic indicators can be determined by assessing the current state of a pedestrian traffic light or a similar device configured to direct pedestrian road crossing. This can be preferably done via visual cameras installed on the robot.

In some embodiments, the sensing of the moving objects can comprise sensing at least one of motor vehicles, rail vehicles, animal powered vehicles and human powered vehicles. That is, the robot can detect not only motorcycles, cars or trucks, but also vehicles such as trains or trams (in case the robot is crossing rails), horse-drawn carriages (often present in the old towns of various cities) and bicycles operating on vehicle roads. The detection can be size and trajectory-based to assess whether the moving objects are hazardous.

In some embodiments, the sensing of the presence of moving objects can further comprise at least one of sensing direction of movement of moving objects, speed of moving objects, change of velocity of moving objects, and rate of change of velocity of moving objects. That is, the trajectory and the speed (including any acceleration and/or deceleration) of moving objects can be computed.

In some embodiments, sensing the hazardous moving object can comprise sensing at least one of an approaching object that is not decelerating, an approaching object that exceeds a minimum size threshold and an approaching object on a collision path with the mobile robot. If the object is decelerating, it could be that it is stopping after having spotted the mobile robot or simply at the intersection. The deceleration is preferably large enough for the object to come to rest at a safe distance from the mobile robot. The minimum size threshold can comprise the standard size of cyclists or bikers. It can be useful to avoid executing the object avoidance maneuver due to false positive (at least for false positives of a small size). The collision path with the mobile robot can be defined as a trajectory coming within a certain minimum range of the mobile robot (such as less than 30 centimeters or so).

In some embodiments, the method can further comprise the step of applying the maximum reverse acceleration in such a way that the mobile robot travels a maximum distance of 1.5 m in reverse. That is, the reverse acceleration would be applied for a sufficient amount of time for the robot to change its direction of motion and come to a standstill after travelling at most 1.5 meters in reverse. That is, the robot would stop once at a safe distance from the moving object's trajectory. This can be advantageous in order to avoid the robot travelling excessively in the backward direction, so that it for example does not end up in the middle of the sidewalk.

In some embodiments, the mobile robot can be configured to travel at least semi-autonomously. That is, the robot need not be controlled by a human for at least some stretches of its operation and travelling.

Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

In some embodiments, the mobile robot can be configured to at least one of delivering items to recipients and picking up items to return to sender. That is, the robot can be used as a delivery robot that carries items for recipients. The robot can also be configured to accept items that recipients might want to return to sender.

In some embodiments, the sensing of the road conditions via the first sensor can comprise sensing objects located at a further distance from the mobile robot than the sensing of the road conditions via the second sensor. That is, the first sensor can be configured to detect objects further away, so that a decision about road crossing can be taken as part of a general situational awareness routine running on the mobile robot. The second sensor can be configured to detect closer objects, potentially with a greater accuracy. The detection would then be analyzed as part of the collision avoidance routine of the mobile robot.

In some embodiments, the first sensor can be configured to detect objects located further from the robot than the reliable range of detection of the second sensor. As discussed above, the first sensor can, for example, comprise a visual camera. Such a sensor could detect objects located several hundreds of meters away from the robot, provided that they are approaching on a reasonably straight path. This can be useful to make the decision about road crossing. The second sensor can comprise, for example, a radar, which would have a reliable range of about 50 meters or so, but be more accurate on this range.

In some embodiments, the second sensor can be configured to detect objects with a greater precision than the first sensor. This can be particularly advantageous, since the collision avoidance module can provide additional safety during one of the most dangerous segments of the robot's path (road crossings). Note, that in this embodiment, the word "object" may refer to both hazardous moving objects and other objects (such as objects to be detected behind the robot before initiating an avoidance maneuver comprising sudden reverse motion). That is, the second sensor can comprise greater precision in both detecting a hazardous moving object to be avoided, and any objects such as pedestrians walking directly behind the robot.

In some embodiments, the method can further comprise determining that a hazardous moving object is present based at least in part on one or more of structure of the road and information about average road traffic density to help to determine. That is, the robot can access data stored in its memory regarding the structure of the road (such as one-way streets, any road bends, traffic rules related to vehicles turning during a pedestrian green light, the number of lanes and the projected time of crossing and other potential historical data). In a specific example, if the robot is crossing a one-way street and detects an incoming hazardous object approaching from the other direction, it is rather probable that this detection is false, and the robot may not execute an avoidance maneuver pending any further corroborating information. The robot can also access information relating to the average road traffic density, such as traffic information depending on the time of day, day of the week, holidays, events, and related information. This information can be used to assess whether a road crossing should be started and/or whether an object avoidance maneuver should be initiated. For example, while crossing roads that overwhelmingly have pedestrian traffic rather than vehicle traffic, the robot may also discard a detection of an incoming hazardous object, since it is very likely a false detection, and executing an avoidance maneuver in the midst of many pedestrians may be hazardous on its own.

In some embodiments, the first sensor and the second sensor can comprise the same sensor. That is, the same sensor such as a visual camera can be used as part of the general awareness module on the robot (that authorizes a road crossing) and as part of the collision avoidance module. The sensors can be used in different ways for those two subroutines. For example, the frame rate of the camera can be increased during a road crossing, in order to obtain more real-time images of the road. Additionally or alternatively, the data from the sensors can be processed in different ways for the two subroutines. However, the two sensors can also comprise the same sensor used in the same way. That is, the present disclosure also includes the case of the two sensors comprising exactly the same sensor (or sensors) used in exactly the same way for both a general situational awareness routine and an object avoidance routine. Furthermore, the robot need not have a separate object avoidance routine, as it can also be fully integrated into the general situational awareness routine.

In some other embodiments, the first sensor and the second sensor comprise different sensors. As mentioned above, it can be advantageous to have sensors with a longer range comprise the first sensor, and more accurate but shorter range sensors comprise the second sensor. Combinations can also be possible. For example, a visual camera can be used as the first sensor, and the same camera in combination with a radar or an ultrasonic sensor can be used as the second sensor.

In some embodiments, at least one of the first sensor and the second sensor comprise at least two distinct sensors configured to sense road conditions in a complementary way. This can be particularly advantageous to increase the redundancy of the system and minimize false positives. However, for increased safety, the robot may perform a collision avoidance maneuver even if only one of the two complementary sensors detects a hazardous moving object. Additionally or alternatively, thresholds of confidence in the sensor's data can be used, so that the collision avoidance maneuver is only initiated above a certain minimum certainty level.

In a second embodiment, a method for a mobile robot located on a pedestrian pathway to avoid collisions when crossing a road adjacent to the pedestrian pathway is disclosed. The method comprises the steps of initiating road crossing, detecting at least one approaching hazardous moving object, computing a trajectory of at least one hazardous moving object, classifying the hazardous moving object, and initiating a collision avoidance maneuver if the trajectory and classification of the hazardous moving object meet certain predefined criteria.

The hazardous moving object can again comprise vehicles such as cars, trucks, motorcycles, trams, trains, horse-drawn carriages, human-powered carriages (such as rickshaws) or bicycles.

Classifying the hazardous moving object can include computing its size, orientation, type and other features. This can be done, for example, by using deep learning techniques.

The predefined criteria for initiating the collision avoidance maneuver can comprise a trajectory intersecting with the robot's trajectory within a certain minimum limit (such as 30 cm for example), a minimum size of the vehicle (so that false positives do not lead to unnecessary avoidance maneuvers), orientation facing towards the robot within a certain minimum degree range (such as 20 degrees for example) and other similar criteria.

In such embodiments, the method can also comprise any of the steps, features and implementations as described above.

In such embodiments, the collision avoidance maneuver can comprise at least one of applying a braking force, applying a forward acceleration, applying a backward acceleration, generating a sound signal, and generating a visual signal. The collision avoidance maneuver can be as described above and further include steps such as verifying that no pedestrians are located within the expected location of the robot post-maneuver and choosing which maneuver to use based on the circumstances such as how much of the distance to the other side of the road has been travelled, whether an abrupt motion forward or backward is possible and other circumstances.

In a third embodiment, the invention discloses a road crossing mobile robot configured to avoid collisions while crossing a road. The robot comprises at least one first sensor configured to sense road conditions. The robot also comprises at least one second sensor configured to sense road conditions. The robot further comprises a processing component connected to the at least one first sensor and to the at least one second sensor. The processing component is configured to detect, from a pedestrian pathway on which the mobile robot is located, that the mobile robot is approaching a road. The processing component is also configured to process road conditions sensed by the at least one first sensor. The processing component is further configured to initiate road crossing if the road conditions are suitable for crossing. The processing component is also configured to process a change in the road conditions sensed by the at least one second sensor indicating a hazardous approaching object while the robot is crossing the road. The processing component is further configured to initiate a collision avoidance maneuver in response to determining that at least one hazardous approaching object is present.

The first and second sensors, the road conditions and further terms used herein can be as described above and below. Furthermore, the mobile robot can be configured to carry out a method according to any embodiments described above and below.

In some embodiments, the road crossing mobile robot can be at least a semi-autonomous robot. That is, the robot can travel autonomously for at least a part of its operation. This is described in more detail above.

In some embodiments, at least one of the first sensor and the second sensor can comprise at least one or a combination of at least one radar, at least one visual camera, at least one stereo camera, at least one time of flight camera, at least one ultrasonic sensor and at least one Lidar sensor. The advantages of using one or more of the same or different sensors as the first and second sensor respectively are also described in more detail above.

In some embodiments, the road conditions can comprise at least one or a combination of status of traffic indicators and presence of moving objects. In such embodiments, the processing component can be configured to determine the status of traffic indicator by assessing the current state of a pedestrian traffic light or a similar device configured to direct pedestrian road crossing. That is, the robot's processing component can, for example, receive images taken by a visual camera (in this case, serving as the first sensor), process these images, and extract information indicating the status of the traffic light. In this way, the robot can identify when it has the right of way based on the pedestrian traffic signals. The processing component can also use historical information regarding the specific traffic lights that it is faced with.

In some embodiments, the first sensor can comprise at least one visual camera configured to take visual images of traffic indicators and the processing component can be configured to analyze the visual images to determine whether road crossing is authorized. Authorizing the road crossing can depend, in this example, on whether traffic lights show a green pedestrian light for the crossing that the robot is planning to take.

In some embodiments, the moving objects comprise at least one of motor vehicles, rail vehicles, animal powered vehicles, and human powered vehicles. The specific exemplary embodiments of this are described above.

In some embodiments, the presence of moving objects can further comprise data related to at least one of direction of movement of moving objects, speed of moving objects, change of velocity of moving object, and rate of change of velocity of moving objects.

In some embodiments, the hazardous moving object can comprise at least one of an approaching object that is not decelerating, an approaching object that exceeds a minimum size threshold, and an approaching object on a collision path with the mobile robot.

In some embodiments, the collision avoidance maneuver can comprise at least one or a combination of the mobile robot applying a braking force, and the mobile robot applying a reverse acceleration. In some such embodiments, the mobile robot can detect, with at least one third sensor, whether or not an object is directly behind the mobile robot and apply reverse acceleration only if no object is detected directly behind the mobile robot. In some such embodiments, the mobile robot checks for objects directly behind it by using at least one third sensor comprising at least one of at least one radar, at least one visual camera, at least one stereo camera, at least one time of flight camera, at least one ultrasonic sensor, and at least one Lidar sensor.

In some embodiments, the maximum reverse acceleration can be applied in such a way that the mobile robot travels a maximum distance of 1.5 m in reverse. This is also discussed in more detail above.

In some embodiments, the road crossing mobile robot can further comprise a body comprising at least one motion component. In some such embodiments, the motion component can comprise at least one wheel. In some preferred embodiments, the motion component can comprise at least four wheels, preferably six wheels. The motion component can allow the mobile robot to travel. The motion component can be particularly optimized for travel on sidewalks and other pedestrian walkways. That is, the motion component can be configured to traverse obstacles such as holes or curbstones. The mobile robot with at least four wheels can be particularly stable while travelling on pedestrian walkways at a relatively low speed (so as to match pedestrian speed). In some such embodiments, the processing component can be configured to control the motion component. That is, the processing component can determine the speed, acceleration, direction of travel and other motion characteristics of the mobile robot, and change them as needed (for example, as part of the collision avoidance maneuver).

In some embodiments, the motion component can further comprise at least one motor. Preferably, the motion component comprises at least two motors, even more preferably at least four motors. This can be advantageous, as it can result in more maneuverability for the robot.

In some embodiments, the mobile robot can be configured to navigate at least semi- autonomously. That is, the robot can select the path to follow and readjust this path at least partially autonomously.

In some embodiments, the mobile robot can be configured to travel on pedestrian walkways. That is, the robot can be relatively small in size and travel with a speed not exceeding 10 km per hour or so. The robot's motion component including the wheels can also be such that it is stable while traveling at such speeds or while traversing obstacles.

In some embodiments, the mobile robot can be configured to at least one of delivering items to recipients and picking up items to return to sender. That is, the robot can navigate to a delivery recipient's address, deliver the item, navigate to a sender's address, pick up another item, deliver this item, and so on. The robot can also comprise an item space, possibly comprising several compartments, where the items can be stored during the robot's travel. The robot can also deliver food, drinks, take out or other consumable items.

In some embodiments, the first sensor can be configured to sense objects located at a further distance from the mobile robot than objects sensed by the second sensor.

In some embodiments, the first sensor can be configured to detect objects located further from the robot than the reliable range of detection of the second sensor.

In some embodiments, the second sensor can be configured to detect objects with a greater precision than the first sensor.

In some embodiments, the processing component can be further configured to use at least one of road structure and average road traffic density information to determine that a hazardous moving object has been detected.

In some embodiments, the first sensor and the second sensor can comprise the same sensor. In some other embodiments, the first sensor and the second sensor can comprise different sensors. The specific advantages of both these implementations are described above.

In some embodiments, at least one of the first sensor and the second sensor can comprise at least two distinct sensors configured to sense road conditions in a complementary way.

In some embodiments, the mobile robot can further comprise an audio component configured to emit sound. The audio component can comprise a speaker that can play prerecorded sounds and/or transmit a message from an operator. As described above, the use of an audio component can help the driver of an approaching vehicle see the robot and avoid a collision.

In some embodiments, the mobile robot can further comprise a light emitting device configured to generate a visual signal. The light emitting device can compries one or a plurality of LEDs, a screen, flashing lights, headlights, and/or other sources of light. The robot can also comprise an antenna or a flag that can make it easier to spot. In such cases, the light emitting device or devices can be located on top of such an antenna or flag.

In a fourth embodiment, the invention discloses a method for a mobile robot initially located on a pedestrian pathway to cross a road adjacent to the pedestrian pathway. The method comprises sensing road conditions via at least one first sensor while still on the pedestrian pathway. The method further comprises initiating a road crossing if the mobile robot determines that road conditions are suitable for crossing. The method also comprises, while crossing the road, the mobile robot sensing via at least one second sensor a change in the road conditions indicating at least one hazardous moving object. The method further comprises initiating a collision avoidance maneuver if the mobile robot detects that at least one hazardous moving object is present. The collision avoidance maneuver comprises the mobile robot checking to see if an object is directly behind the mobile robot. It also comprises the mobile robot traveling backwards in the direction of the pedestrian pathway from which the mobile robot entered the road if the mobile robot determines that there is no object directly behind the mobile robot.

That is, in such embodiments, the preferred collision avoidance maneuver that the mobile robot executes comprises abrupt reversal and travelling backwards so as to get out of the way of an approaching hazardous vehicle (such as a fast travelling car). This may be particularly advantageous, as quickly reversing can often be a very efficient way of avoiding an impending collision. However, it can be beneficial to verify whether any pedestrians are located in the vicinity of the robot, such as directly behind it, so that no collision between the robot and the pedestrians occurs. That is, "objects" that may be directly behind the robot can refer to pedestrians, bikes or similar objects.

In some such embodiments, sensing a change in road conditions indicating at least one hazardous moving object can comprise detecting an approaching object while the mobile robot is crossing the road. It can also comprise computing the object's trajectory and size. It can further comprise initiating said collision avoidance maneuver if the computed trajectory and size meet predefined criteria. It can also comprise continuing the road crossing if the computed trajectory and size do not meet said predefined criteria. As previously explained, this can be advantageous to avoid performing a collision avoidance maneuver due to a detection of a fast travelling object such as a bird, or a car travelling on a trajectory that would not bring it into collision with the mobile robot.

In some such embodiments, the method can further comprise, prior to the mobile robot checking to see if an object is directly behind the mobile robot, the mobile robot determining whether it has reached a halfway point in crossing the road, and the mobile robot checking to see if an object is directly behind, only if the halfway point has not yet been reached.

In some embodiments, the method can further comprise the mobile robot checking to see if an object is directly in front of the mobile robot. It also comprises, if the mobile robot determines that there is no object directly in front of the mobile robot, the mobile robot accelerating to speed up the road crossing. In some such embodiments, the method can also comprise, prior to the mobile robot checking to see if an object is directly in front of the mobile robot, the mobile robot determining whether it has reached a halfway point in crossing the road, and the mobile robot checking to see if an object is directly in front, only if the halfway point has not yet been reached.

That is, if the robot has crossed the halfway point of the road (or of a lane in which a collision is expected), the robot may not choose to reverse and travel backwards, but rather verify whether any objects (such as pedestrians) are present directly in front of it, and, if not, continue travelling forward, preferably with an increased speed and/or acceleration.

In some embodiments, the at least one second sensor can be configured to detect objects with a greater precision than the first sensor. That is, the second sensor can comprise a more precise sensor than the first sensor. It can also comprise the same sensor as the first sensor used in a different, more precise way. The second sensor can also comprise a combination of sensors used together, yielding a more precise result than the first sensor (which may comprise one of the sensors used as a combination for the second sensor, or another combination of sensors). In a concrete example, the second sensor can comprise a radar, such as a Doppler radar, used in combination with a visual camera. This can yield a more precise result than just using a visual camera, or a combination of visual cameras, particularly as regards hazardous moving objects.

In some embodiments, sensing of the road conditions via the first sensor can comprise sensing objects located at a further distance from the mobile robot than the sensing of the road conditions via the second sensor. That is, the second sensor may be more precise when sensing road conditions at a smaller distance than the first sensor.

In some embodiments, the method can further comprise the mobile robot initiating said road crossing at a pedestrian crossing having a pedestrian traffic light.

The present invention is also defined by the following numbered embodiments.

Below is a list of method embodiments. Those will be indicated with a letter "M". Whenever such embodiments are referred to, this will be done by referring to "M" embodiments.

M1. A method for a mobile robot located on a pedestrian pathway to avoid collisions when crossing a road adjacent to the pedestrian pathway, the method comprising the steps of:
    the mobile robot approaching the road from the pedestrian pathway;
    the mobile robot sensing road conditions via at least one first sensor;
    the mobile robot initiating road crossing if the road conditions are deemed suitable for crossing;
    while crossing the road, the mobile robot sensing via at least one second sensor a change in the road conditions indicating at least one hazardous moving object; and
    the mobile robot initiating a collision avoidance maneuver, in response to determining that at least one hazardous moving object is present.

M2. The method according to the preceding embodiment wherein the collision avoidance maneuver comprises at least one or a combination of
    applying a braking force; and
    applying a reverse acceleration.

M3. The method according to the preceding embodiment wherein the collision avoidance maneuver comprises:
    determining whether or not an object is directly behind the mobile robot; and
    applying the reverse acceleration only if no object is sensed directly behind the mobile robot.

M4. The method according to the preceding embodiment further comprising the step of the mobile robot sensing for objects directly behind it by sensing via at least one third sensor comprising at least one of
    at least one radar;
    at least one visual camera;
    at least one stereo camera;
    at least one time of flight camera;
    at least one ultrasonic sensor; and
    at least one Lidar sensor.

M5. The method according to any of the preceding embodiments wherein the collision avoidance maneuver comprises applying a forward acceleration.

M6. The method according to any of the preceding embodiments wherein the collision avoidance maneuver further comprises at least one of
    generating at least one audio signal; and
    generating at least one visual signal.

M7. The method according to any of the preceding embodiments wherein the sensing by at least one of the at least one first sensor and the at least one second sensor comprises at least one or a combination of sensing by
    at least one radar;
    at least one visual camera;
    at least one stereo camera;
    at least one time of flight camera;
    at least one ultrasonic sensor; and
    at least one Lidar sensor.

M8. The method according to any of the preceding embodiments wherein the road conditions sensed by at least one of the first sensor and the second sensor comprise at least one or a combination of sensing
    status of traffic indicators; and
    presence of moving objects.

M9. The method according to the preceding embodiment wherein the sensing of the status of traffic indicators is determined by assessing the current state of a pedestrian traffic light or a similar device configured to direct pedestrian road crossing.

M10. The method according to any of the preceding embodiments and with features of embodiment M4 wherein the sensing of the moving objects comprises sensing at least one of
    motor vehicles;
    rail vehicles;
    animal powered vehicles; and
    human powered vehicles.

M11. The method according to any of the preceding embodiments and with features of embodiment M4 wherein the sensing of the presence of moving objects further comprises at least one of sensing
   direction of movement of moving objects;
   speed of moving objects;
   change of velocity of moving objects; and
   rate of change of velocity of moving objects.

M12. The method according to any of the preceding embodiments wherein sensing the hazardous moving object comprises sensing at least one of
   an approaching object that is not decelerating;
   an approaching object that exceeds a minimum size threshold; and
   an approaching object on a collision path with the mobile robot.

M13. The method according to any of the preceding embodiments and with the features of embodiment M2 further comprising applying the reverse acceleration in such a way that the mobile robot travels a maximum distance of 1.5 m in reverse.

M14. The method according to the preceding embodiment wherein the mobile robot is configured to travel at least semi-autonomously.

M15. The method according to any of the preceding embodiments wherein the mobile robot is configured to at least one of
   delivering items to recipients; and
   picking up items to return to sender.

M16. The method according to any of the preceding embodiments wherein the sensing of the road conditions via the first sensor comprises sensing objects located at a further distance from the mobile robot than the sensing of the road conditions via the second sensor.

M17. The method according to any of the preceding embodiments wherein the first sensor is configured to detect objects located further from the robot than the reliable range of detection of the second sensor.

M18. The method according to any of the preceding embodiments wherein the second sensor is configured to detect objects with a greater precision than the first sensor.

M19. The method according to any of the preceding embodiments further comprising determining that a hazardous moving object is present, based at least in part on one or more of (a) the structure of the road and (b) information about average road traffic density.

M20. The method according to any of the preceding embodiments wherein the first sensor and the second sensor comprise the same sensor.

M21. The method according to any of the preceding embodiments wherein the first sensor and the second sensor comprise different sensors.

M22. The method according to any of the preceding embodiments wherein at least one of the first sensor and the second sensor comprise at least two distinct sensors configured to sense road conditions in a complementary way.

M23. A method for a mobile robot located on a pedestrian pathway to avoid collisions when crossing a road adjacent to the pedestrian pathway, the method comprising:
   initiating road crossing;
   detecting at least one approaching hazardous moving object;
   computing a trajectory of the at least one hazardous moving object;
   classifying the hazardous moving object; and
   initiating a collision avoidance maneuver if the trajectory and classification of the hazardous moving object meet certain predefined criteria.

M24. The method according to the preceding embodiment wherein the method is according to any of the embodiments M1 to M15.

M25. The method according to embodiment M16 wherein the collision avoidance maneuver comprises at least one of
   applying a braking force;
   applying a forward acceleration;
   applying a backward acceleration;
   generating a sound signal; and
   generating a visual signal.

Below is a list of device embodiments. Those will be indicated with a letter "D". Whenever such embodiments are referred to, this will be done by referring to "D" embodiments.

D1. A road crossing mobile robot configured to avoid collisions while crossing a road, the mobile robot comprising
   at least one first sensor configured to sense road conditions;
   at least one second sensor configured to sense road conditions; and
   a processing component connected to the at least one first sensor and to the at least one second sensor, and configured to
      detect, from a pedestrian pathway on which the mobile robot is located, that the mobile robot is approaching a road;
      process road conditions sensed by the at least one first sensor;
      initiate road crossing if the road conditions are suitable for crossing;
      process a change in the road conditions sensed by the at least one second sensor indicating a hazardous approaching object while the robot is crossing the road; and
      initiate a collision avoidance maneuver, in response to determining that at least one hazardous approaching object is present.

D2. The road crossing mobile robot according to the preceding embodiment wherein the mobile robot is at least a semi-autonomous robot.

D3. The road crossing mobile robot according to any of the preceding device embodiments wherein at least one of the first sensor and the second sensor comprises at least one or a combination of
   at least one radar;
   at least one visual camera;
   at least one stereo camera;
   at least one time of flight camera;
   at least one ultrasonic sensor; and
   at least one Lidar sensor.

D4. The road crossing mobile robot according to any of the preceding device embodiments wherein the road conditions comprise at least one or a combination of
   status of traffic indicators; and
   presence of moving objects.

D5. The road crossing mobile robot according to the preceding embodiment wherein the processing component is configured to determine the status of traffic indicator by assessing the current state of a pedestrian traffic light or a similar device configured to direct pedestrian road crossing.

D6. The road crossing mobile robot according to any of the preceding embodiments and with the features of embodiment D4 wherein the first sensor comprises at least one visual camera configured to take visual images of traffic indicators and wherein the processing component is configured to analyze the visual images to determine whether road crossing is authorized.

D7. The road crossing mobile robot according to any of the preceding device embodiments and with features of embodiment D4 wherein the moving objects comprise at least one of
- motor vehicles;
- rail vehicles;
- animal powered vehicles; and
- human powered vehicles.

D8. The road crossing mobile robot according to any of the preceding device embodiments and with features of embodiment D4 wherein the presence of moving objects further comprises data related to at least one of
- direction of movement of moving objects;
- speed of moving objects;
- change of velocity of moving objects; and
- rate of change of velocity of moving objects.

D9. The road crossing mobile robot according to any of the preceding device embodiments wherein the hazardous moving object comprises at least one of
- an approaching object that is not decelerating;
- an approaching object that exceeds a minimum size threshold; and
- an approaching object on a collision path with the mobile robot.

D10. The road crossing mobile robot according to any of the preceding embodiments wherein the collision avoidance maneuver comprises at least one or a combination of
- the mobile robot applying a braking force;
- the mobile robot applying a reverse acceleration;
- the mobile robot applying a forward acceleration;
- the mobile robot applying a backward acceleration;
- the mobile robot generating a sound signal; and
- the mobile robot generating a visual signal.

D11. The road crossing mobile robot according to the preceding embodiment wherein the mobile robot is configured to
- detect, with at least one third sensor, whether or not an object is directly behind the mobile robot; and
- apply reverse acceleration only if no object is detected directly behind the mobile robot.

D12. The road crossing mobile robot according to the preceding embodiment wherein the at least one third sensor comprises at least one of
- at least one radar;
- at least one visual camera;
- at least one stereo camera;
- at least one time of flight camera;
- at least one ultrasonic sensor; and
- at least one Lidar sensor.

D13. The road crossing mobile robot according to any of the preceding device embodiments and with the features of embodiment D11 wherein the maximum reverse acceleration is applied in such a way that the mobile robot travels a maximum distance of 1.5 m in reverse.

D14. The road crossing mobile robot according to any of the preceding device embodiments wherein the mobile robot further comprises a body comprising at least one motion component.

D15. The road crossing mobile robot according to the preceding embodiment wherein the motion component comprises at least one wheel.

D16. The road crossing mobile robot according to any of the preceding device embodiments and with the features of embodiment D14 wherein the motion component comprises at least four wheels, preferably six wheels.

D17. The road crossing mobile robot according to any of the preceding device embodiments and with the features of embodiment D14 wherein the processing component is configured to control the motion component.

D18. The road crossing mobile robot according to any of the preceding device embodiments wherein the motion component further comprises at least one motor.

D19. The road crossing mobile robot according to any of the preceding device embodiments wherein the mobile robot is configured to navigate at least semi-autonomously.

D20. The road crossing mobile robot according to any of the preceding device embodiments wherein the mobile robot is configured to travel on pedestrian walkways.

D21. The road crossing mobile robot according to any of the preceding device embodiments wherein the mobile robot is configured to at least one of
- delivering items to recipients; and
- picking up items to return to sender.

D22. The road crossing mobile robot according to any of the preceding device embodiments wherein the first sensor is configured to sense objects located at a further distance from the mobile robot than objects sensed by the second sensor.

D23. The road crossing mobile robot according to any of the preceding device embodiments wherein the first sensor is configured to detect objects located further from the robot than the reliable range of detection of the second sensor.

D24. The road crossing mobile robot according to any of the preceding device embodiments wherein the second sensor is configured to detect objects with a greater precision than the first sensor.

D25. The road crossing mobile robot according to any of the preceding device embodiments wherein the processing component is further configured to use at least one of road structure and average road traffic density information to determine that a hazardous moving object has been detected.

D26. The road crossing mobile robot according to any of the preceding device embodiments wherein the first sensor and the second sensor comprise the same sensor.

D27. The road crossing mobile robot according to any of the preceding device embodiments wherein the first sensor and the second sensor comprise different sensors.

D28. The road crossing mobile robot according to any of the preceding device embodiments wherein at least one of the first sensor and the second sensor comprise at least two distinct sensors configured to sense road conditions in a complementary way.

D29. The road crossing mobile robot according to any of the preceding device embodiments further comprising an audio component configured to emit sound.

D30. The road crossing mobile robot according to any of the preceding device embodiments further comprising a light emitting device configured to generate a visual signal.

D31. The road crossing mobile robot configured to carry out a method according to any of the preceding method embodiments.

The present technology will now be discussed with reference to the accompanying drawings.

DESCRIPTION OF EMBODIMENTS

Figure 1:
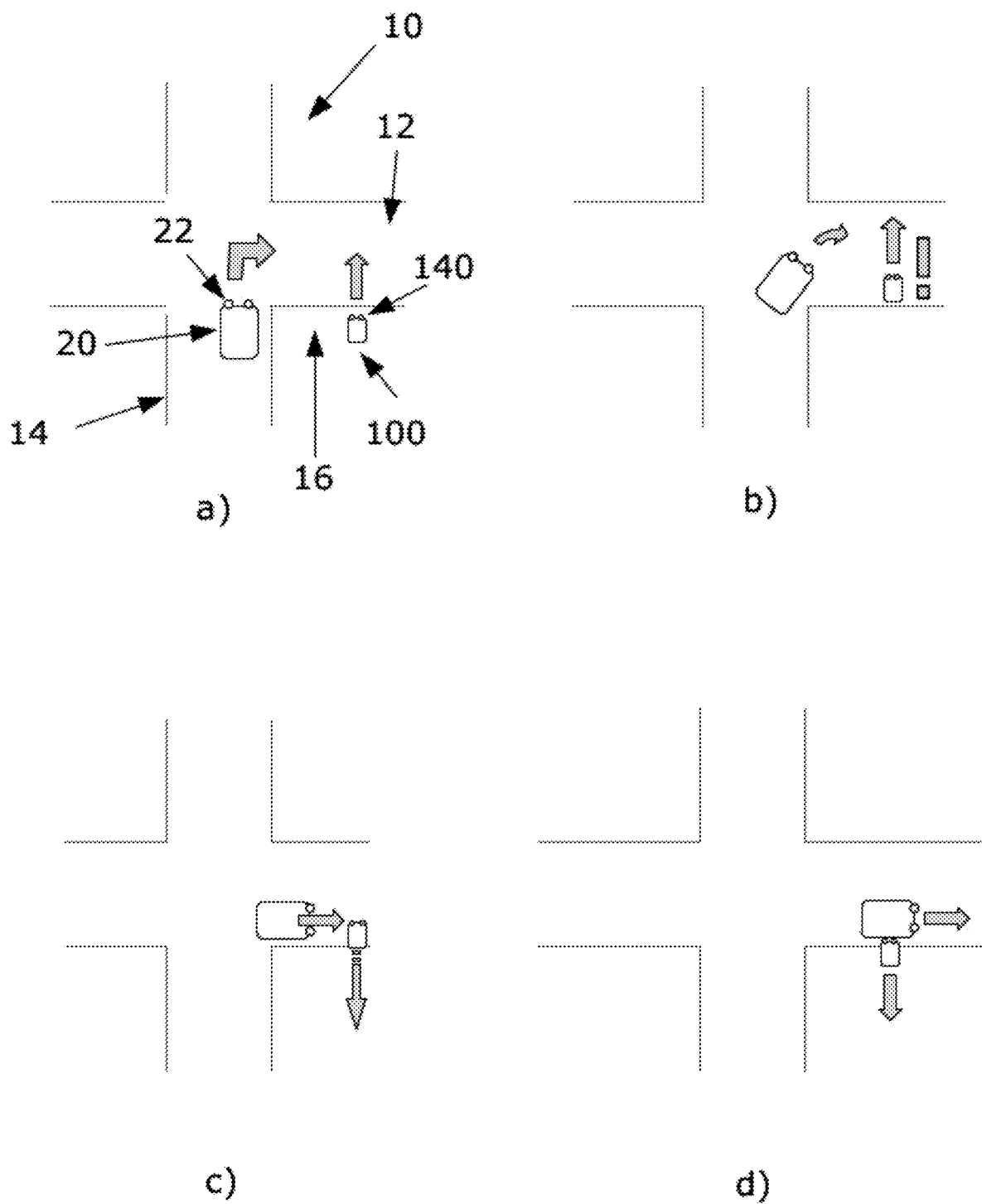
FIG. 1 comprises four sketches schematically depicting a mobile robot avoiding collision as per one embodiment of the invention.

FIG. 1 schematically depicts an embodiment of the invention in four sketches. In sketch a), a mobile robot 100 has approached a road crossing 10 (such as an intersection 10) and is about to start crossing a first road 12. The mobile robot 100 as depicted in sketch a) is located on a sidewalk 16 (that can also comprise a walkway, a path, a pavement, a road verge and/or the ground immediately preceding the first road 12). A moving object 20 (such as a vehicle 20, bike 20 or a similar object travelling on public roads) has also approached the road crossing 10 on a second road 14 (in the depicted case, the first road 12 and the second road 14 are substantially perpendicular), and is about to turn onto the first road 12. The direction of travelling of both the mobile robot 100 and the mobile object 20 are shown by the respective arrows. Headlights 22 and robot headlights 140 indicate the front of each of the moving object 20 and the mobile robot 100 respectively.

Sketch b) shows the moving object 20 rounding the corner onto the first road 12. At this instant, the moving object 20 is on the first road 12 but outside a pedestrian crossing on which mobile robot 100 is crossing the first road 12. The mobile robot 100 is depicted as having just detected that the moving object 20 is on a potential collision course (the detection indicated by an exclamation mark). At the time of detection of a potential collision, the mobile robot 100 has already left the sidewalk 16 and started crossing the first road 10, but has not yet reached the middle of the first lane (in case of more than one lane per direction of travel, this can refer to the middle of the lane onto which the mobile object 20 is turning). Note, that if the robot already reached the middle of the first lane, upon detecting the moving object 20 on a collision course, the robot can accelerate in the direction of travel to finish traversing the first road 12 as soon as possible.

Sketch c) schematically shows the mobile robot 20 applying a collision avoidance maneuver as per one embodiment of the invention. The mobile robot is shown as accelerating in the direction opposite to the one it was travelling in originally (the acceleration being depicted by a broken arrow). That is, the mobile robot 20 can either directly accelerate backwards and/or apply a braking force, and then accelerate backwards. The mobile robot 100 can then start travelling back towards the sidewalk 16. Note, that the mobile robot preferably travels in reverse to return to the sidewalk 16 or get close enough to it to avoid collision with the moving object 20. Turning around could be too time costly and could jeopardize collision avoidance. In sketch c), the moving object 20 has fully turned onto the first road and is approaching the mobile robot 100.

Sketch d) shows that mobile robot 100 having evaded collision with the moving object 20 and returned back to the sidewalk 16. The moving object 20 continues on its way on the first road 12. The mobile robot 100 can the wait until the moving object 20 passes by, verify that no further hazardous moving objects are detected, and then restart crossing the first road 12.

Note, that the above explanation also applies to the robot crossing a second half of the road starting from the median strip, the mobile object approaching from the first road 12 and not turning from the second road 14, the mobile object coming from a driveway or a similar road off-shoot and other similar scenarios. The sketches shown in FIG. 1 are exemplary only and should not be taken as limiting the scenarios in which the collision avoidance maneuvers can be applied.

Figure 2:
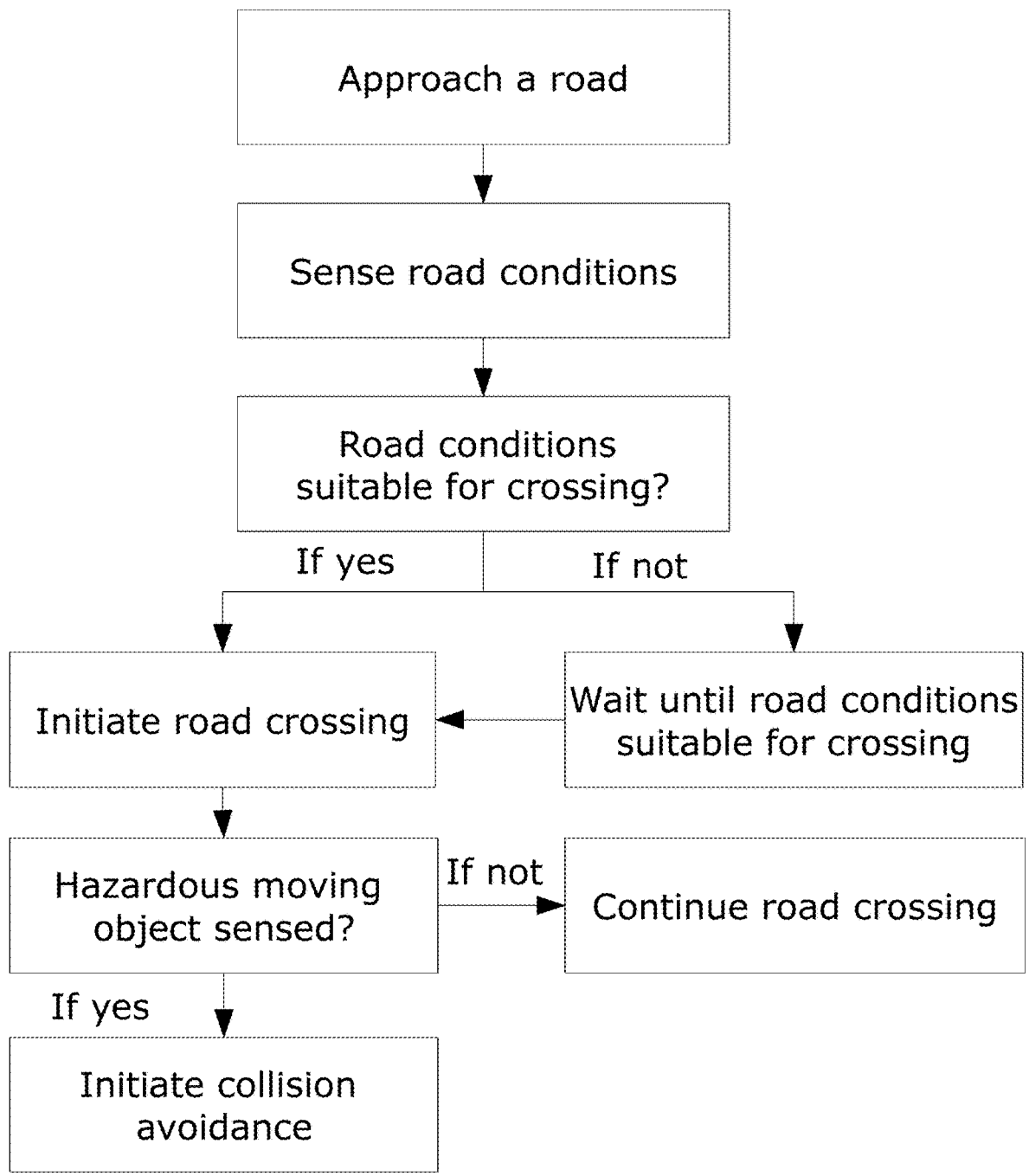
FIG. 2 schematically illustrates one embodiment of the invention.

FIG. 2 depicts a flowchart demonstrating one embodiment of the invention. In a first step, a road such as a vehicle road is approached (preferably by a land-based mobile robot as described above and below). The road can preferably be approached at a pedestrian crossing or a similar place.

Then, data relating to road conditions can be detected. This can preferably be done via a mobile robot's sensors such as visual cameras or radar sensors. The road conditions data can comprise the presence of moving objects in the vicinity of the crossing place and/or moving towards it, the speed and expected trajectory of such objects, as well as the status of any pedestrian crossing indicators such as traffic lights. The road conditions can also include the visibility and/or the uncertainties in detecting any of the moving objects and/or crossing indicators.

In the following step, the data relating to road conditions can be processed (preferably by the mobile robot's processing component and/or by a server in communication with the mobile robot), and it can be evaluated whether the detected road conditions are suitable for road crossing. This can mean that at least one or all of the following are the case: the crossing indicator is such that crossing is permitted (for example, the pedestrian crossing light is on), no hazardous moving objects are detected (that is, no moving objects are detected on a trajectory that would potentially bring them onto a collision course with the mobile robot), the visibility and/or the uncertainties in the data are estimated as acceptable.

If the road conditions are determined to be unsuitable for crossing, the next step can comprise waiting until the road conditions become suitable for crossing. This can mean, for example, that the mobile robot waits on the sidewalk and periodically analyzes the new data relating to road conditions obtained by its sensors. Once the road conditions are determined to be suitable for crossing, crossing can be initiated.

If the road conditions are determined to be suitable for crossing, road crossing can be initiated. That is, the mobile robot's processing component can actuate the robot's motion component so as to prompt the robot to move in the direction of the road crossing.

While crossing the road, the mobile robot can periodically use its sensors and/or its processing component to verify whether a hazardous moving object has been detected. The hazardous moving object can comprise a moving object above a certain size moving with a speed, direction and/or acceleration that can put it on a collision course with the mobile robot. For example, the hazardous moving object can comprise a vehicle turning around a corner and not showing signs of the driver having seen the mobile robot (that is, no deceleration or own avoidance maneuvers). The hazardous moving object can also comprise a bicycle approaching at a speed that would put it on a collision course with a mobile robot, and/or other moving objects in other contexts.

If no hazardous moving object is detected while the robot is crossing the road, the mobile robot can continue to cross the road until the other side is reached.

If a hazardous moving object is detected, a collision avoidance maneuver can be initiated. The collision avoidance maneuver can comprise a sequence of actions that the mobile robot can take to avoid a collision. It is discussed in more detail in relation to FIG. 4.

Figure 3:
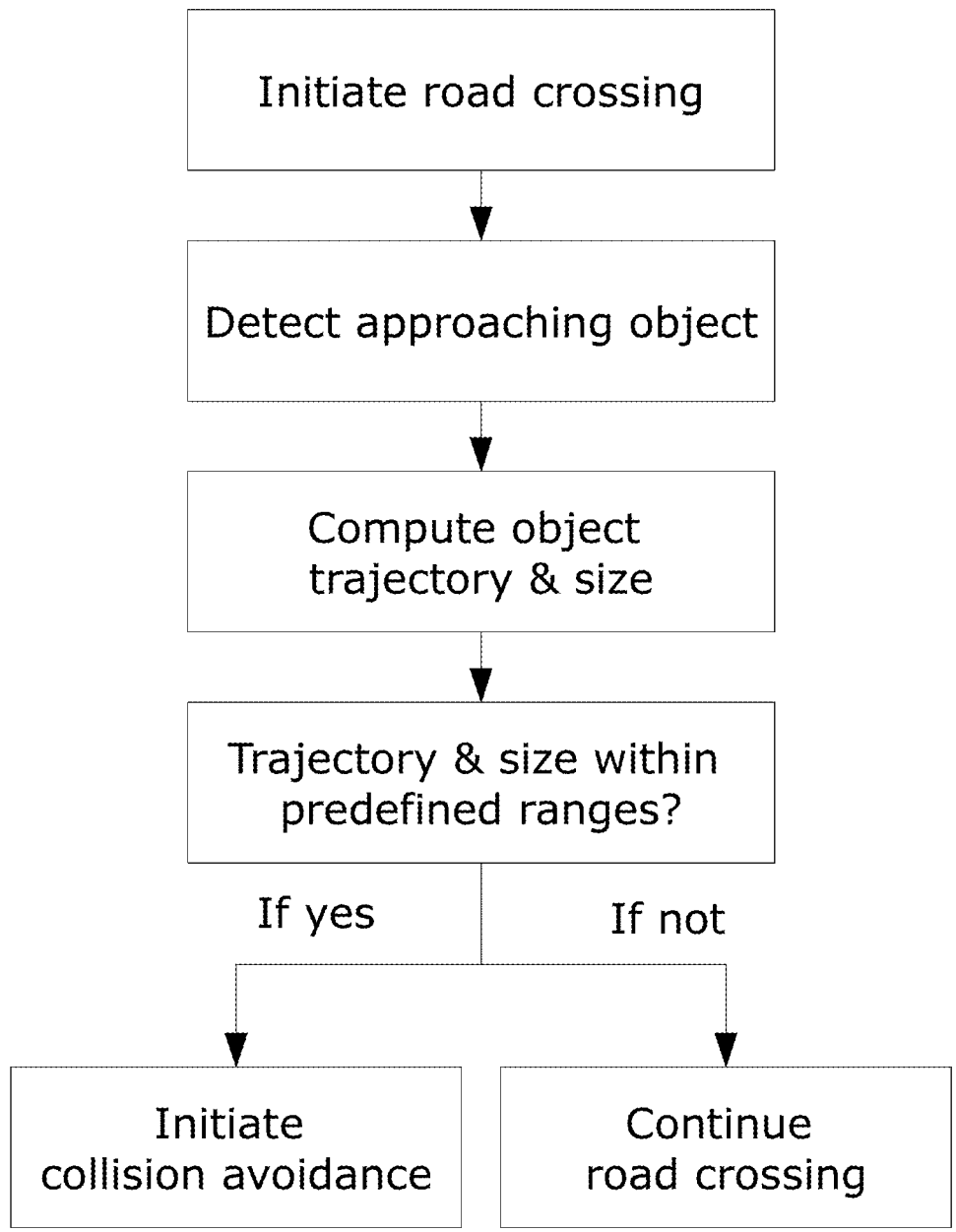
FIG. 3 schematically illustrates another embodiment of the invention.

FIG. 3 schematically illustrates another embodiment of the invention. The depicted flowchart is also preferably executed by a mobile robot configured to travel on pedestrian pathways. First, the road crossing is initiated. For example, the mobile robot's processing component can actuate the moving component in the direction of road crossing.

While crossing the road, the robot can be using its sensor and/or sensors to verify whether any objects are approaching. The approaching objects can be detected via sensors such as cameras, radars, ultrasonic sensors, Lidar, time of flight cameras or other sensors.

Once an approaching object is detected, its size and trajectory can be computed. This can also be done by the processing component of the mobile robot. The trajectory can be computed based on the speed, direction of travel and/or acceleration of the object.

In the next step, it is verified whether the trajectory and size of the approaching object are within certain predefined ranges. The goal of this step is to filter out objects that may not pose a threat (such as pedestrians or false positives) or objects on trajectories that do not pose a risk of collision. The predefined range for size can comprise a minimum size corresponding approximately to a cyclist. The predefined range for trajectory can comprise trajectories passing within less than half a meter from the expected trajectory of the mobile robot (the precise lower bound can also be determined based on the accuracy of the sensors and the error rates associated with the expected trajectories).

If the trajectory and size of the approaching object are both within the predefined ranges (that is, a collision is likely and the object is likely a bicycle, a vehicle or a similar object with which collision is preferably avoided), a collision avoidance maneuver can be initiated by the mobile robot.

If one of the trajectory and size of the approaching object are not within the predefined objects, the robot can continue crossing the road while on the lookout for further approaching objects.

Figure 4:
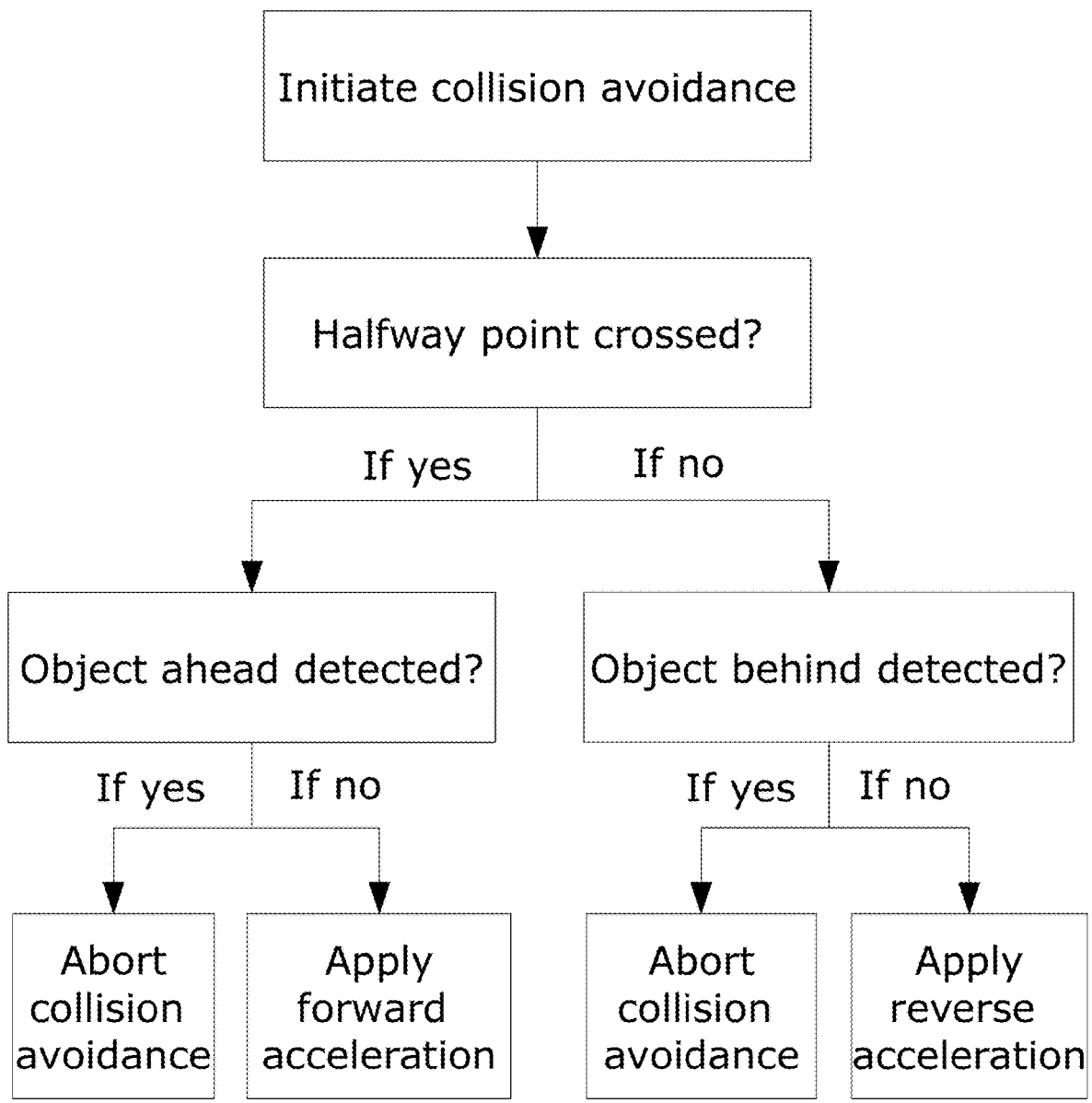
FIG. 4 schematically illustrates an embodiment of a collision avoidance maneuver.

FIG. 4 schematically depicts one embodiment of the object avoidance maneuver. First, the collision avoidance maneuver can be initiated. This can be done, for example, by the processing component of the mobile robot after having determined that the collision avoidance maneuver is necessary and/or advisable. In other words, the robot has detected a hazardous moving object that is on a collision course with it.

The second step can comprise verifying whether the halfway point of the lane has been crossed. In other words, the robot can determine whether it is presently located before or after the halfway point of the lane that it is presently crossing. This can be done to evaluate whether abrupt forward motion or abrupt backward motion would most likely result in the success of the collision avoidance maneuver. Additionally or alternatively, the robot can simply verify whether it has passed a certain predefined threshold counting from the start of the road it is crossing (that is, from the end of the sidewalk and/or curb). This threshold can comprise approximately 1.5 meters.

If the halfway point has been crossed, the next step comprises verifying whether any objects are present in front of the robot within a certain predefined distance. In other words, the robot can use its sensors to check whether any pedestrians, cyclists or other traffic participants are also crossing the road and are located in front of the robot at a certain small distance (such as a meter or less for example). The robot can also verify whether the traffic participant in front of it is moving towards it or away from it (that is, whether the traffic participant is crossing the road in the opposite direction or in the same direction). If the robot determines that an object (such as a traffic participant) is detected in front of it in such a manner that would make collision with it probable in case the robot abruptly accelerates forwards, the robot can abort the collision avoidance maneuver and consider alternative means of avoiding the collision with the hazardous moving object (such as accelerating backwards instead and/or braking). If the robot determines that no such traffic participant is detected in front of it (that is, no object that the robot would be likely to collide with in case of abrupt forward acceleration), the robot can apply a forward acceleration. That is, the robot can accelerate towards the opposite side of the road with the aim of changing its trajectory in such a way so as to avoid collision with the hazardous moving object.

If the halfway point has not been crossed and/or if the predefined threshold distance from the start of the road crossing has not been reached, the next step comprises verifying whether any objects are present behind the robot within a certain predefined distance. That is, the robot can use its sensors to verify whether any pedestrians, cyclists and/or other traffic participants are located within a small distance behind it. The robot can also check whether the object (that is, traffic participant) is moving towards it or away from it (that is, is crossing the road in the same direction or in the opposite direction). If the robot determines that a traffic participant is located behind it in such a way that would make collision likely in the event of abrupt backwards acceleration, the robot can abort the collision avoidance maneuver. In this case, the robot can take other means to avoid collision with the hazardous moving object (such as accelerating forward instead and/or braking). If no such traffic participant is detected, the robot can proceed to apply a reverse acceleration. That is, the robot can accelerate backwards in a manner that would preferably reverse its direction of movement from forwards to backward. The robot can preferably move in a reverse mode, but in some other embodiments the robot may turn around first before moving backwards.

Figure 5:
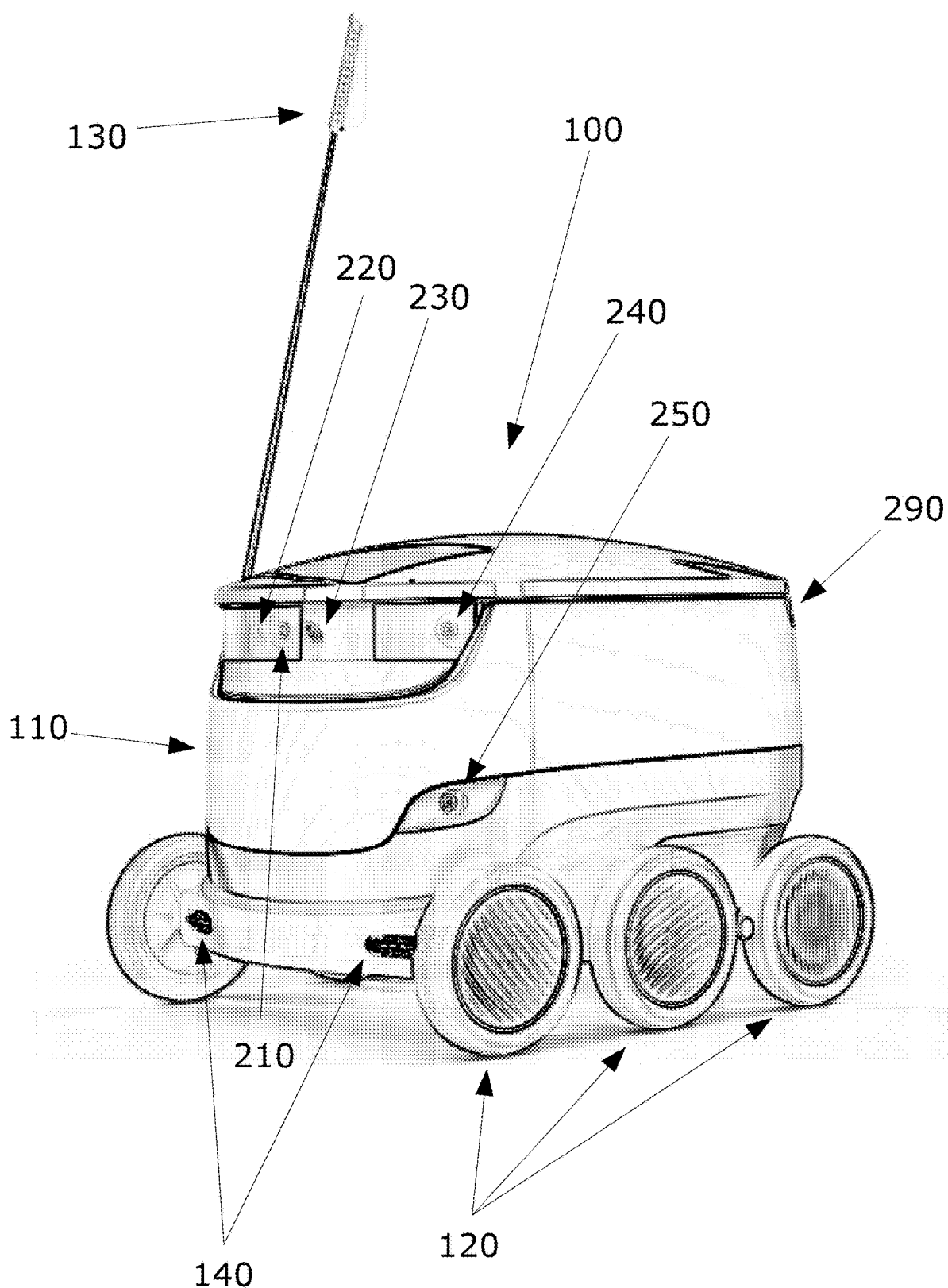
FIG. 5 depicts a mobile robot as per one aspect of the invention.

FIG. 5 demonstrates an exemplary embodiment of a mobile robot configured to execute an object avoidance maneuver. The mobile robot 100 comprises a body 110. The body 110 can comprise an item space in which items can be transported. Preferably, the mobile robot 100 can be a delivery robot configured to deliver items to recipients, collect returns and/or otherwise participate in exchange of goods.

The mobile robot 100 further comprises a motion component 120 (depicted as wheels 120). In the present embodiment, the motion component 120 comprises six wheels 120. This can be particularly advantageous for the mobile robot 100 when traversing curbstones or other similar obstacles.

The mobile robot 100 further comprises a flagpole or stick 130 used to increase the visibility of the robot. Particularly, the visibility of the robot during road crossings can be increased. In some embodiments, the flagpole 130 can comprise an antenna. The mobile robot 100 further comprises robot headlights 140 configured to facilitate the robot's navigation in reduced natural light scenarios and/or increase the robot's visibility further. The headlights are schematically depicted as two symmetric lights 140, but can comprise one light, a plurality of lights arranges differently and other similar arrangements.

The mobile robot 100 also comprises sensors 210, 220, 230, 240, 250, and 290. The sensors are depicted as visual cameras in the figure, but can also comprise radar sensors, ultrasonic sensors, Lidar sensors, time of flight cameras and/or other sensors. Further sensors can also be present on the mobile robot 100. One sensor can comprise a front camera 210. The front camera 210 can be generally forward facing. The sensors may also comprise front, side and/or back stereo cameras 220, 230, 240, 250, 290. The front stereo cameras 220 and 230 can be slightly downward facing. The side stereo cameras 240 and 250 can be forward-sideways facing. There can be analogous side stereo cameras on the other side of the robot (not shown in the figure). The back stereo camera 290 can be generally backward facing. The sensors present on multiple sides of the robot can contribute to its situational awareness. That is, the robot can be configured to detect approaching objects and/or hazardous moving objects from a plurality of sides and act accordingly.

Figure 6:
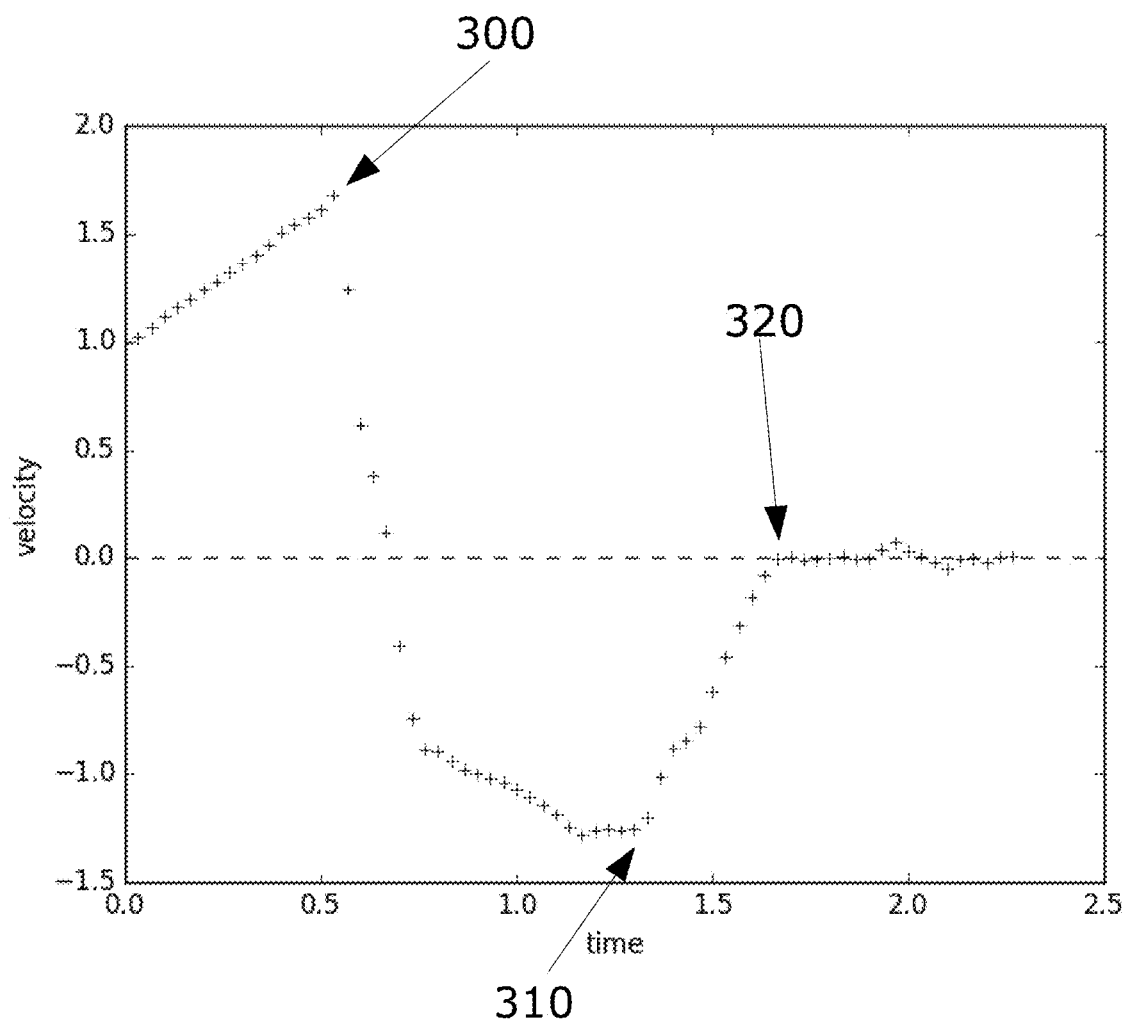
FIG. 6 depicts an exemplary velocity profile during a collision avoidance maneuver.

FIG. 6 depicts a schematic example of a velocity profile before and during a collision avoidance maneuver. On the x-axis, time in seconds is given, and on the y-axis, robot velocity in meters per second is shown. The graph depicts the robot 100 starting to accelerate in order to quickly cross the road. The robot's velocity is increasing until a first event 300 a little after T=0.5 s at which point the robot is traveling around 1.6 m/s (roughly 3.6 Miles per Hour). The first event 300 corresponds to the robot detecting a hazardous moving object and initiating a collision avoidance maneuver. The robot 100 applies a reverse acceleration (preferably a maximum reverse acceleration), and the velocity decreases until it passes zero around T=0.7 s (and the robot 100 comes to a momentary standstill) and becomes negative (and the robot starts moving backwards). The negative velocity is increasing until a second event 310 at around T=1.3 s. The second event 310 corresponds to the robot having reversed sufficiently to avoid collision and applying a forward acceleration once more to come to a standstill. Third event 320, at around T=1.7 s, shows the robot 100 coming to a standstill having avoided a collision. This preferably occurs when the robot is back on the sidewalk or the side of the road where the road crossing was initiated. Thus, after detecting a hazardous moving object while traveling in a forward direction, the robot reverses direction and starts moving backwards in under 0.5 s (more precisely, in this example 0.7 s-0.5 s=0.2 s) and comes to a standstill within about 1.2 s (in this example, 1.7 s-0.5 s).

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

What is claimed is:

1. A road crossing mobile robot configured to avoid collisions while crossing a road, the mobile robot comprising at least one first sensor configured to sense road conditions;

at least one second sensor configured to sense road conditions; and a processing component connected to the at least one first sensor and to the at least one second sensor, and configured to:

detect, from a pedestrian pathway on which the mobile robot is located, that the mobile robot is approaching a road;

process road conditions sensed by the at least one first sensor;

initiate road crossing at a pedestrian crossing, if the mobile robot determines that the road conditions are suitable for crossing by the mobile robot;

process a change in the road conditions sensed by the at least one second sensor indicating a hazardous approaching object while the robot is crossing the road; and initiate a collision avoidance maneuver, in response to determining that at least one hazardous approaching object is present on the road but outside the pedestrian crossing, and is on a trajectory that intersects a trajectory of the mobile robot within a certain minimum limit; wherein:

the mobile robot has a plurality of wheels; and the collision avoidance maneuver comprises moving backwards within 0.5 seconds of determining that said at least one hazardous object is present.

2. The road crossing mobile robot according to claim 1, wherein the processing component is configured to cause mobile robot to move backwards within 0.2 seconds of determining that said at least one hazardous object is present.

3. The road crossing mobile robot according to claim 1, wherein the mobile robot is configured to move backwards a maximum distance of 1.5 m, upon determining that said at least one hazardous object is present.

4. The road crossing mobile robot according to claim 1, wherein the mobile robot is configured to generate at least one of a sound signal and a visual signal, upon determining that said at least one hazardous object is present.

5. The road crossing mobile robot according to claim 1, wherein the mobile robot is configured to:

detect, with at least one third sensor, whether or not an object is directly behind the mobile robot; and apply reverse acceleration only if no object is detected directly behind the mobile robot.

6. The road crossing mobile robot according to claim 5, wherein the at least one third sensor comprises at least one of at least one radar;

at least one visual camera;

at least one stereo camera;
at least one time of flight camera;
at least one ultrasonic sensor; and
at least one Lidar sensor.

7. The road crossing mobile robot according to claim 1, wherein the first sensor is configured to detect objects located further from the mobile robot than a reliable range of detection of the second sensor.

8. The road crossing mobile robot according to claim 7, wherein the second sensor is configured to detect objects with a greater precision than the first sensor.

9. The road crossing mobile robot according to claim 1, wherein the processing component is configured to classify the hazardous approaching object.

10. The road crossing mobile robot according to claim 1, wherein the mobile robot further comprises one or more compartments configured to store items for delivery by the mobile robot.

\* \* \* \* \*